A. SLAUGHTER.
Cheese Vat.
No. 61,959.　　　　　　　　　　　Patented Feb. 12, 1867.
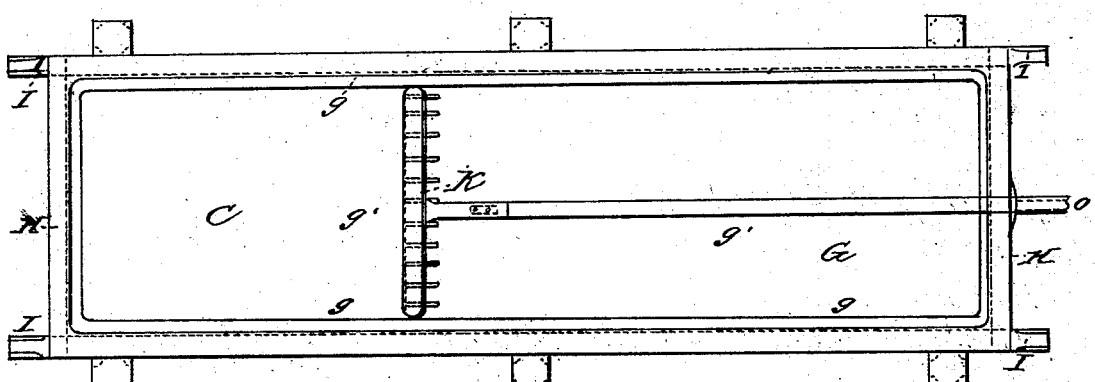
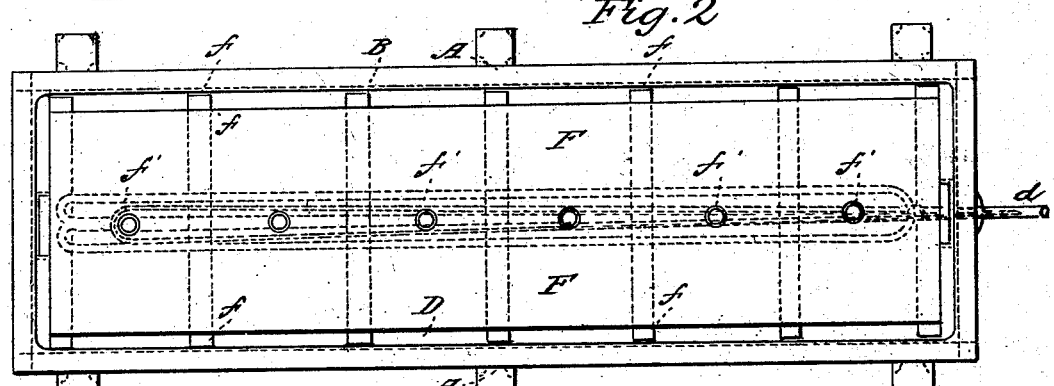
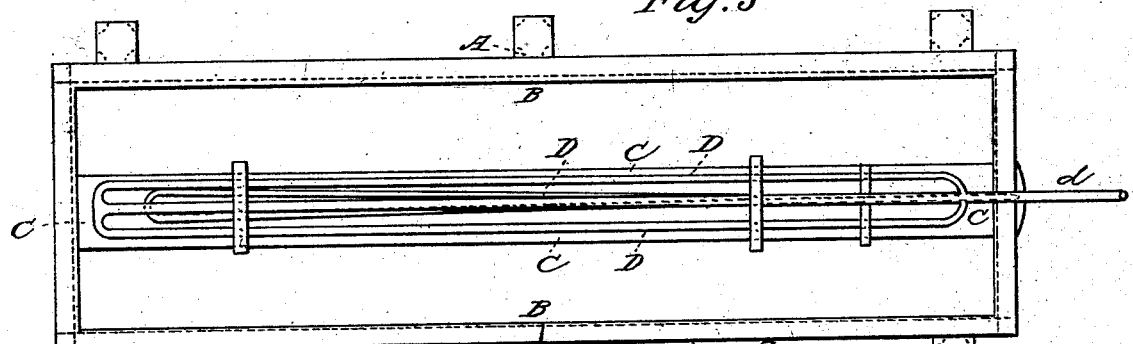
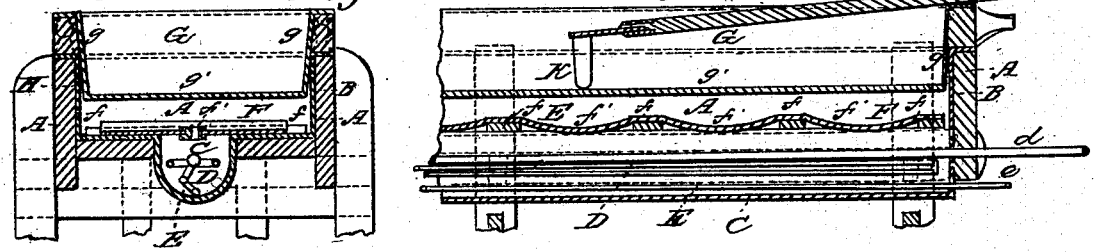
Witnesses:　　　　　　　　　　　Inventor:

United States Patent Office.

ALANSON SLAUGHTER, OF MIDDLETOWN, NEW YORK.

*Letters Patent No. 61,959, dated February 12, 1867.*

IMPROVEMENT IN CHEESE VATS.

*The Schedule referred to in these Letters Patent and making part of the same.*

TO ALL PERSONS TO WHOM THESE PRESENTS SHALL COME:

Be it known that I, ALANSON SLAUGHTER, of Middletown, in the county of Orange, and State of New York, have invented an Improved Cheese Vat, and do hereby declare that the following is a full, clear, and exact description of the same, reference being had to the accompanying drawings, of which—

Figure 1 is a top view of my invention, showing agitator.

Figure 2, a top view, with milk vat removed from the heating apparatus, showing corrugated heat disseminator.

Figure 3, a top view with disseminator removed.

Figure 4, a longitudinal section of the several parts; and

Figure 5, a transverse section of same.

The nature of my invention consists in constructing a cheese vat so that the heat intended to coagulate or curdle the milk shall be conveyed through a body of water, aided by a corrugated disseminator, and thus be equally distributed beneath the under surface, or bottom, of the milk vat; and this I accomplish by placing below the milk vat a trough, which I partially fill with water, said trough having an open recess, running lengthwise, for reception of a series of pipes, through which steam is admitted for the purpose of heating the water to the desired temperature, and also for a series of pipes through which the condensed steam is conveyed from the steam pipes and trough; and thus I obtain the desideratum for cheese-making.

Having described the nature of my invention, I will now describe its construction and operation.

In the drawings, A is an ordinary trough with metallic or other lining, B, for containing the water through which heat is to be conveyed to the milk vat. C is a segmental recess running lengthwise of and projecting below the bottom of the trough for reception of a series of steam pipes, D, which course around in the recess C, and have a steam entrance at $d$ outside the trough. E is another series of pipes parallel and connected with the steam pipes in said recess, and it conveys the condensed steam and water outside the trough by a pipe, $e$. F is the corrugated disseminator sustained by rods, $f$, at the swell of each corrugation, while in the hollow of each corrugation there is a circular aperture, $f'$, through which the water condensed by contact with the bottom of the milk vat G descends into the recess C of the trough A. This disseminator is smaller in extent than the interior of the trough, affording the heat a chance to pass all around and between it and the sides of the trough to the bottom of the milk vat. G is the milk vat, which is composed of a frame, H, having handles, I I, and a metallic or other suitable lining, $g$, which forms the interior of the vat, and is so constructed that while the frame H rests on the trough and makes a steam-tight joint with it, the bottom $g'$ projects downward into the trough and the water contained therein to receive its heat for coagulation of the milk in said vat; and K is the serrated agitator used by the operator for the purpose of keeping the curd in motion and cutting the same during coagulation.

The operation is as follows: I first fill the milk vat G with milk; I next pour the water into the trough through a pocket on one end of the same; I then admit the steam through the pipe $d$, and when the temperature is about 84° Fahrenheit I apply rennet sufficient to produce coagulation of the milk in from thirty to forty minutes. I now use the agitator K for the purpose of agitating and cutting the curd until it is of the proper size; and when the curd assumes the temperature of about 98° Fahrenheit, I shut off the steam and allow the curd to remain in the vat G until the required amount of lactic acid has developed in the curd, when I draw off the whey, salt the curd, and remove the same to the press.

What I claim as my invention, and desire to secure by Letters Patent, is—

The arrangement and combination of the hot-water trough A with its recess C, the steam and drip pipes D E, the corrugated disseminator F, and milk vat G, with or without the agitator K, substantially as and for the purpose herein specified.

In testimony whereof I have hereunto set my signature.

ALANSON SLAUGHTER.

Witnesses:
A. NEILL,
WM. C. LEFFERTS.